(12) United States Patent
Hosali et al.

(10) Patent No.: US 7,099,883 B2
(45) Date of Patent: Aug. 29, 2006

(54) SYSTEM AND METHOD OF LINKING DISSIMILAR DATABASES USING POINTERS

(75) Inventors: Tejaswini Hosali, Durham, NC (US); William John Reilly, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 538 days.

(21) Appl. No.: 10/091,761

(22) Filed: Mar. 6, 2002

(65) Prior Publication Data
US 2003/0172047 A1 Sep. 11, 2003

(51) Int. Cl.
*G06F 17/00* (2006.01)
(52) U.S. Cl. ............. 707/101; 707/1; 707/2; 707/3
(58) Field of Classification Search ........ 707/101, 707/1, 2, 3, 6, 7, 100, 102, 104, 200, 201, 707/10, 202
See application file for complete search history.

(56) References Cited

U.S. PATENT DOCUMENTS

| | | | |
|---|---|---|---|
| 5,899,988 A * | 5/1999 | Depledge et al. | 707/3 |
| 6,055,227 A | 4/2000 | Lennert et al. | 370/254 |
| 6,108,669 A | 8/2000 | Dalenberg et al. | 707/203 |
| 6,112,209 A * | 8/2000 | Gusack | 707/101 |
| 6,243,712 B1 | 6/2001 | Lennert et al. | 707/104.1 |
| 6,301,477 B1 | 10/2001 | Lennert et al. | 455/433 |
| 6,324,547 B1 | 11/2001 | Lennert et al. | 707/204 |

* cited by examiner

*Primary Examiner*—Charles Rones
*Assistant Examiner*—Belix M. Ortiz
(74) *Attorney, Agent, or Firm*—Samuel A. Kassatly

(57) ABSTRACT

A linking system and associated method are used to link two or more large dissimilar databases. The linking system generally includes a software program installed on a server with access to databases such as customer databases and organization databases. The linking system includes pointers, as needed, to link customers with positions, jobs, groups or other organizational entities. These pointers allow for a reduced maintenance of the underlying data, while the number of pointers used is relatively small. In addition, the set of information for each pointer can be modified without changing the structure or information of the linked databases.

16 Claims, 3 Drawing Sheets

SYSTEM AND METHOD OF LINKING DISSIMILAR DATABASES USING POINTERS

FIELD OF THE INVENTION

The present invention relates in general to database structure and design. More specifically, this invention relates to a method and system for linking the information in at least two existing dissimilar databases without altering the data or structures of the databases. The invention uses pointers that are external to the database information and structure to link the dissimilar databases.

BACKGROUND OF THE INVENTION

Database systems are collections of files stored on computers or other linked systems such as the Internet. The files together contain all the information about a topic or related topics. Generally, a file system is used to "file away" information which a user will later retrieve for processing. A file typically resides in directly accessible storage and can be manipulated as a unit by file system operations. The file system allows a user the means for storing data in files, the means for accessing the data in those files, the means for managing direct access to storage space where the files are stored, and the means for guaranteeing the integrity of those files.

Database systems are used by organizations to manage information about clients, orders, client accounts, and so forth. In addition, organizational databases are maintained that manage information about organization structure, employees, position, job, accounts, etc. When dealing with clients and orders, the organization often needs to locate and contact the appropriate employee or group for an issue being addressed. The organization could change the structure of the databases to link employees and groups with clients and purchase orders, but this data changes frequently and would require constant change and maintenance. For large databases with dissimilar structures and programming languages, linking becomes even more difficult.

While it would be useful to link different databases to correlate data such as purchase orders, clients, employees, and groups, reprogramming the databases and then maintaining the links between these databases could become inconvenient, inefficient, and cost prohibitive. What is needed, therefore, is a system for externally linking databases, which does not require modification of the databases. The need for such a system has heretofore remained unsatisfied.

SUMMARY OF THE INVENTION

The system and method of the present invention, for dynamically linking dissimilar databases satisfy this need. The system and method link two or more large, dissimilar databases using one or more sets of pointers. These pointers relate, for example, customers with positions, jobs, and groups in the organization based on a central piece of information.

The pointers contain a much smaller set of information than the databases, and can be changed without changing the underlying database information. As an example, the organization changes the group that supports a specific customer or manages the customer's account. The customer/client information does not change and neither does the inherent structure of the organization. Instead, the pointers between the customer and the organization are changed, thus modifying the relationship between them.

Some of the features and advantages provided by the present system and method for dynamically linking dissimilar databases are as follows:

Ease of database maintenance because pointers linking the databases are based on easily accessible data elements that relate to the client and the organization databases.

Reduced maintenance of the underlying data comprised of, for example, millions of customer records and thousands of organizational positions. As an example, editing multiple database records is not required each time the organizational structure changes.

Flexible design and application allowing multiple pointers to different positions and groups based on client records.

Avoiding the necessity of sending customer or organizational changes to different systems utilizing this information. Required changes are incorporated in the dynamic character of the system of the invention, not by the structure of the databases or the information in the databases.

In addition to the performance benefits listed above, the use of the present system and method supports the structural flexibility of the company or organization. Pointers between clients and positions or groups within the organization are not limited to the organization structure. Rather, the system and method of the present invention support an organization with separate account-administrator groups; which feature could be particularly useful for large organizations.

The present system and method also support internal organizations that determine their own structure of account administrator offices, i.e., grouped by branch office, individual account administrators, by geographic area, etc, allowing greater autonomy for the internal organizations.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

IDoc: Acronym for intermediate document, and refers to a file sent from an external customer using a format such as Electronic Data Interchange (EDI), for a system to read.

Internet: A collection of interconnected public and private computer networks that are linked together with routers by a set of standards protocols to form a global, distributed network.

Local Area Network: A communications network that serves users within a confined geographical area. It is made up of servers, workstations, a network operating system and a communications link.

Parse: To divide text into small components that can be analyzed. Parsing is often divided into lexical analysis and semantic parsing. Lexical analysis concentrates on dividing strings into components, called tokens, based on punctuation and other keys. Semantic parsing then attempts to determine the meaning of the string.

Pointer: Refers to the relationship to a set of data. A pointer can be used to reference specific sets of data while also allowing arguments to be passed.

Figure 1:
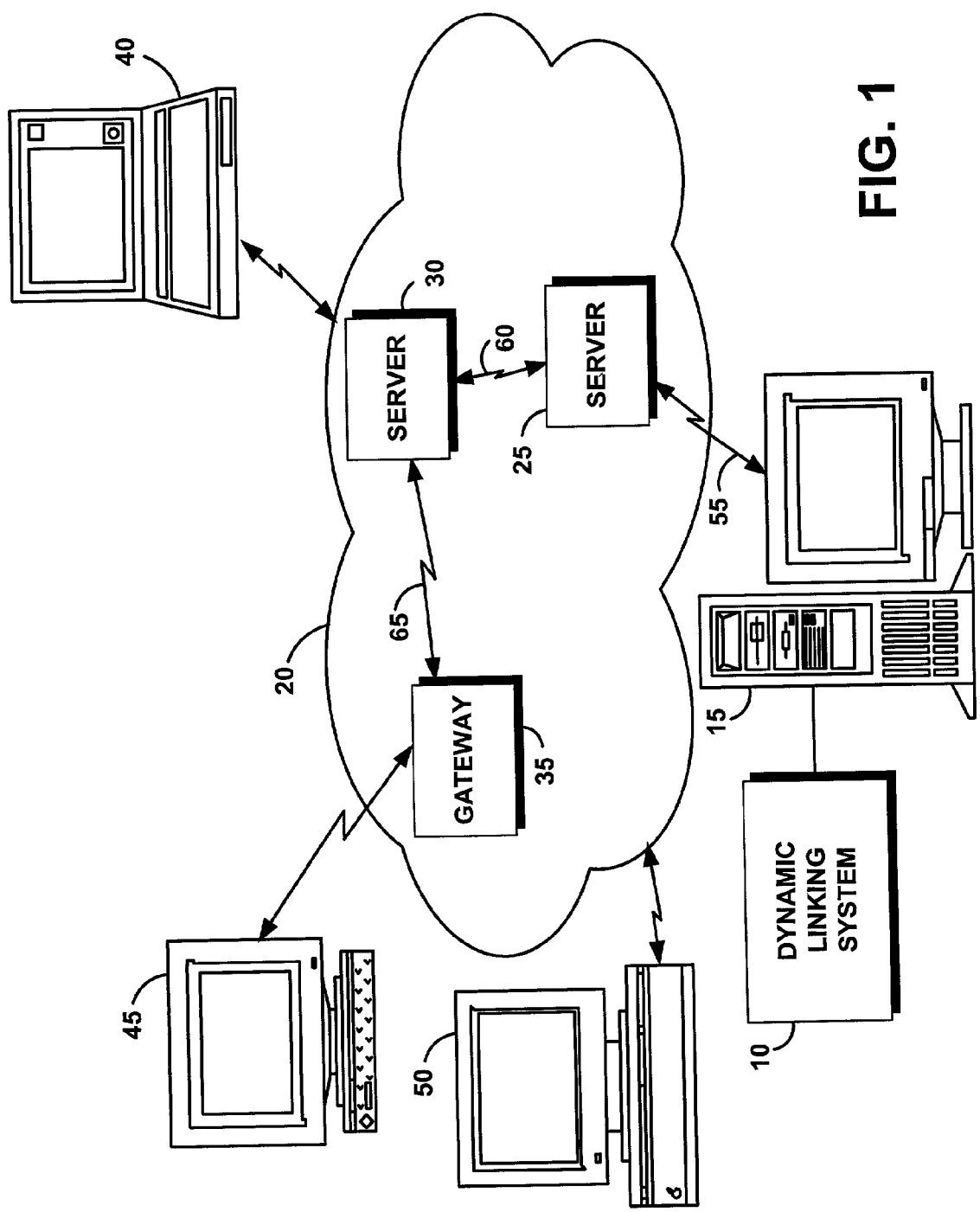
FIG. 1 is a schematic illustration of an exemplary operating environment in which a system and method for dynamically linking dissimilar databases may be used according to the present invention.

FIG. 1 portrays an exemplary environment in which a system and method for dynamically linking databases, according to the present invention, may be used. The dynamic linking system 10 includes a software or computer program product that is typically embedded within or installed on a host server 15. Alternatively, the system 10 can be saved on a suitable storage medium such as a diskette, a CD, or hard drive, or like devices.

The cloud-like communication network 20 is comprised of communication lines and switches connecting servers such as servers 25, 30 to gateways such as gateway 35. The servers 25, 30 and the gateway 35 provide the communication access to the Internet. Users, such as managers, employees, clients, or other remote Internet users are represented by a variety of computers such as computers 40, 45, 50. The host server 15 is connected to the network 20 via a communications link 55 such as a telephone, cable, or satellite link. The servers 25, 30 can be connected via high speed Internet network lines 60, 65 to other computers and gateways.

Figure 2:
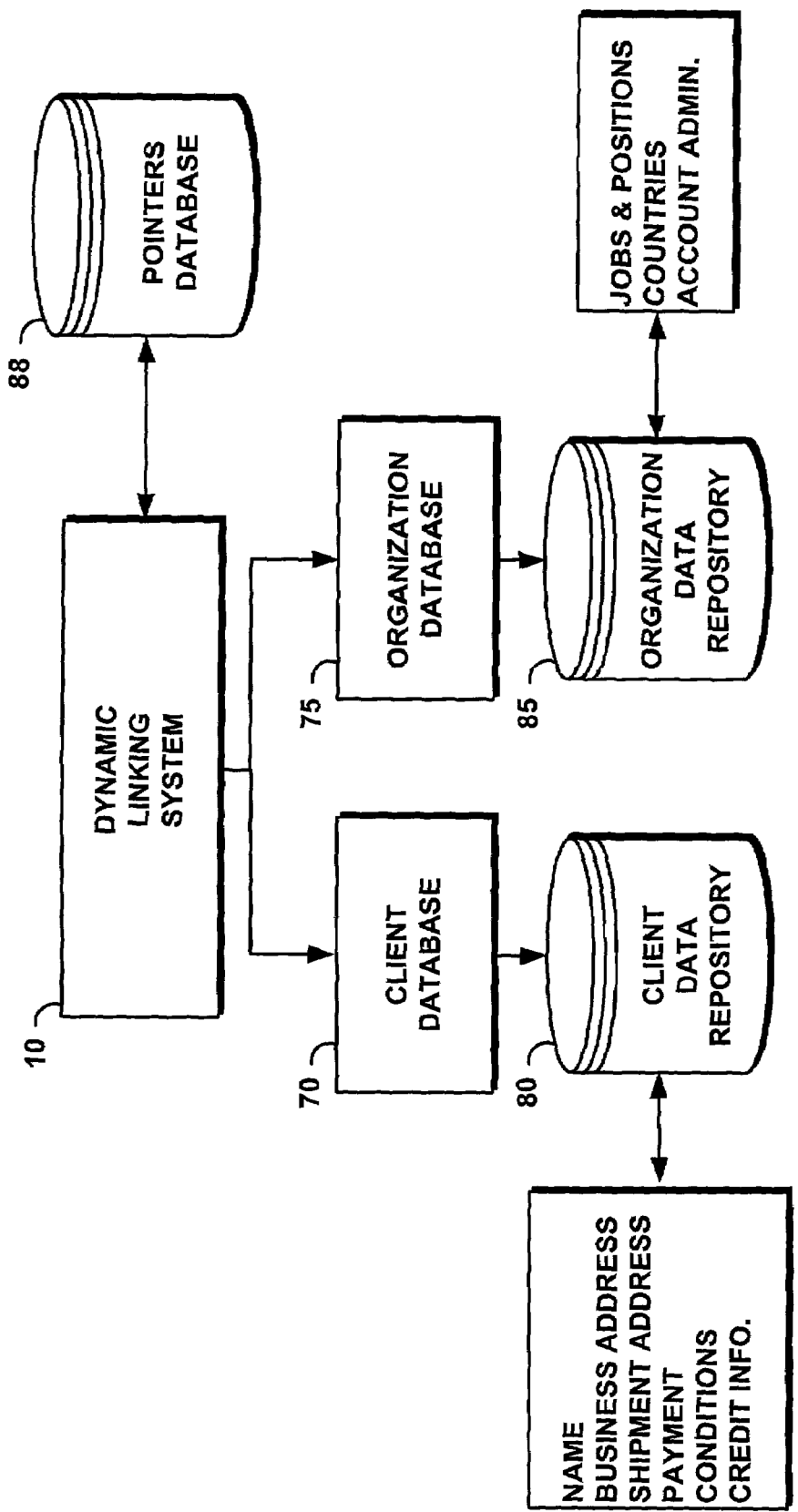
FIG. 2 is block diagram showing a method for externally linking dissimilar databases in conjunction with a client database and an organization database.

FIG. 2 shows a high-level architecture of the system 10 in use with a client database 70 and an organization database 75. For illustration purpose only, and to assist in a better appreciation of the present invention without limiting its scope, the system 10 will be described in conjunction with a particular example.

According to an exemplary embodiment, the system 10 includes a pointers database 88, and is installed on a computer or server 15 with access to the client database 70. The data for the client database 70 is stored in a client data repository 80. The client database 70 contains files and records corresponding, for example, to clients including the customer reference number, the client's country of residence, the client's account administrator contact number, and the client's e-mail address.

The data for the organization database 75 is stored in an organization data repository 85. The organization database 75 contains files and records corresponding for example, to clients including contains files and records corresponding to the organizational structure and employees, including sales organizations, positions, jobs, group codes, account administrator contact numbers, and e-mail addresses.

Figure 3:
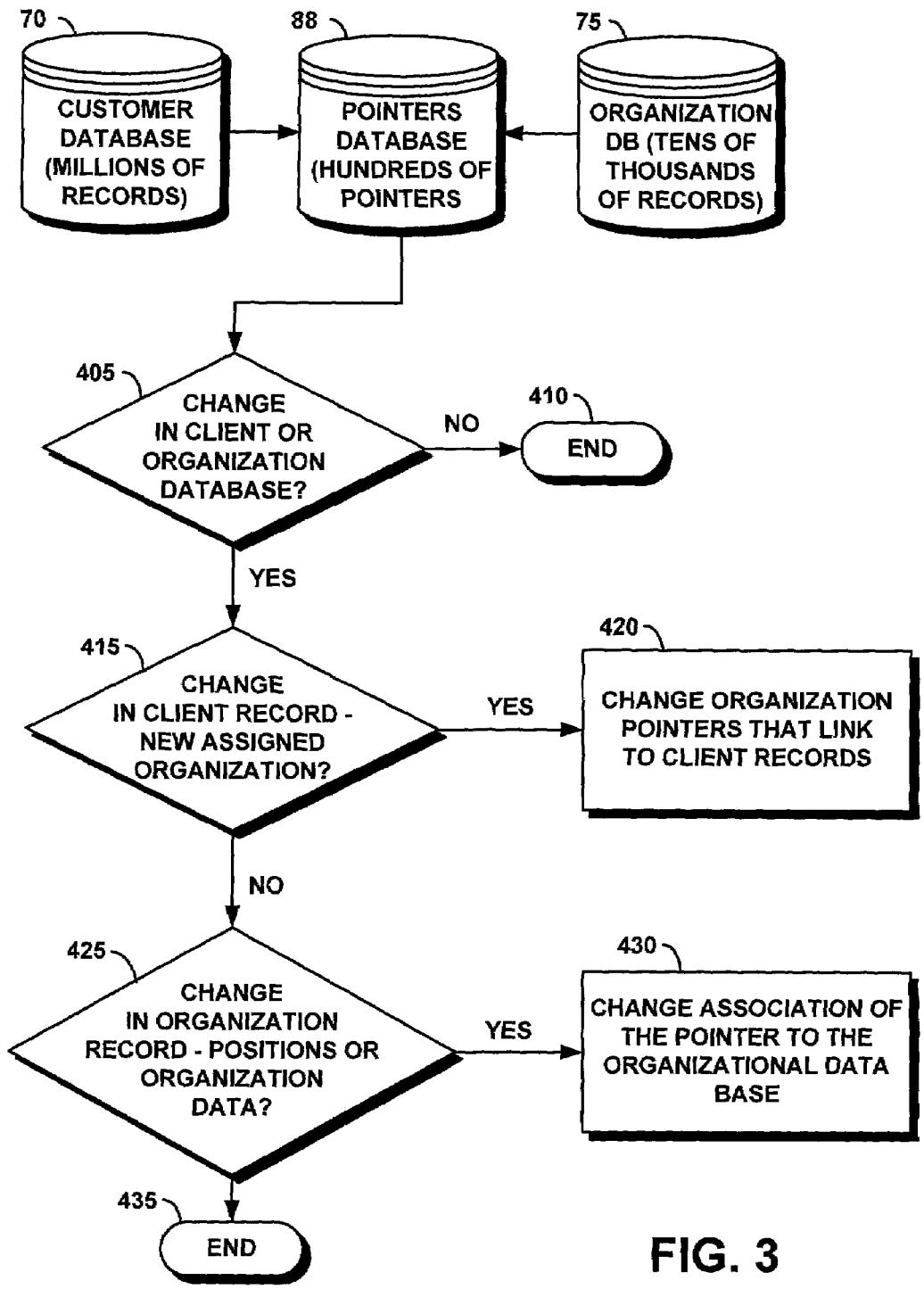
FIG. 3 is a flowchart illustrating an exemplary process used by the system of the present invention to make changes to a database linking a customer database to an organization database, using the system of FIGS. 1 and 2.

The operation of the dynamic linking system 10 can be illustrated by the routing of relevant information through the organization workflow, as illustrated in the flowchart of FIG. 3. The system 10, operating in conjunction with an Internet routing system, receives an electronic document via the Internet, local area network, or any other appropriate electronic transmission.

The dynamic linking system 10 accesses information contained in the client database 70 and the organization database 75. In operation, an electronic document, IDoc, is sent to the dynamic linking system 10 through the Internet or local area network.

The pointer in the pointers database 88 that links the customer to the organization, is determined by the account administrator's group code, the client's country of residence, and the sales organization. Any other criteria could be used to define the pointers, as required. In the present example, the pointers can be an organizational text link which relates to a partner function link on the client/customer records.

With further reference to FIG. 3, using the external information from the customer database 70 and the organization database 75, the relationships between the customers (or clients) in the customer database 70 and the organization in the organization database 75, are determined by at least one set of pointers in the pointer database 88. In this example, the pointers form a pointers database 88 that acts as an external link between the customer database 70, that is comprised of millions of customers' records, with the organization database 75 that is comprised of thousands of organizational positions. As an example, the ratio of the number of records contained in the pointers database 88 to the number of records contained in either customer database 70 or the organization database 75 ranges between approximately 0.005% and 5%.

The pointers, numbering for example in the hundreds, are comprised of a much smaller set of information for each pointer than that stored for each record in the client or the organization databases. Linking the customer database 70 with the organization database 75 through pointers, allows for reduced maintenance of the data in the two databases 70, 75. The links between the customers and organization can be changed without changing the data in either database 70 or 75.

For example, the system 10 can add or change Account Administrator "contact records" on the customer master data. The Account Administrator may be either an organizational group or an individual. For a large organization with many independent subgroups, the Account Administrator group organization can vary from one subgroup to the next. This is especially true for subgroups organized by country; each subgroup or country may define the relationship between the Account Administrator and the customer differently.

In this exemplary embodiment, the system 10 associates contact records with the customers' records through relationship settings in the pointers. The contact records contain information on the organization database pointers. For example, the customer information has specific partner relationships that hold contact numbers. These contact numbers hold organizational pointer field values on that contact record.

These pointers are linked to one or more specific groups, specific positions, and/or specific jobs. Changes can be made to the organization database without affecting the client database by simply changing the contact record. Conversely, changes can be made to the customer database 70 without affecting the organization database 75.

The process used to make changes to contact records is illustrated in FIG. 3. The system 10 creates the pointers database 88 that relates the customer database 70 with the organization database 75. When a record change occurs, the system 10 first checks the pertinence of the change to existing client/organization links, at step 405. If neither the customer record nor the organization record has changed, the system 10 ignores the change and terminates at step 410.

If, however, a change to the internal group responsible for a specific client is detected at decision step 415, the system 10 changes the pointers that link the internal group to the client at step 420. If a change to the organization or position information of the internal group is detected at step 425, the system 10 changes the association of the pointer to the organization database 75 at step 430. Otherwise, no changes are made to the pointers database 88, and the system 10 terminates at step at step 435.

It is to be understood that the specific embodiments of the invention that have been described are merely illustrative of certain application of the principle of the present invention. Numerous modifications may be made to the method for externally linking dissimilar databases invention described herein without departing from the spirit and scope of the present invention. Moreover, while the present invention is described for illustration purpose only in relation to the Internet and e-mail communications, it should also be clear that the invention is applicable as well to documents and files shared electronically over any type of electronic or wireless network.

What is claimed is:

1. A method for dynamically linking at least two dissimilar databases, comprising:

linking the two dissimilar databases by means of a pointers database that either one of the at least two dissimilar databases;

the pointers database receiving instructions external to the at least two dissimilar databases, to effect relationships changes between the at least two dissimilar databases;

in response to the external instructions, selectively changing pointers between records in the at least two dissimilar databases by changing records in the pointers database, without changing the records in the at least two dissimilar databases; and wherein a ratio of the number of records contained in the pointers database to the number of records contained in either one or the at least two dissimilar databases ranges between approximately 0.005% and 5%.

2. The method of claim 1, wherein the at least two dissimilar databases include a customer database and an organization database.

3. The method of claim 2, further comprising:

the pointers database detecting a change to a record in the customer database; and in response to the change to the record in the customer database, selectively changing a pointer in the pointers database, without changing the records in the organization database.

4. The method of claim 3, wherein the change to the record in the customer database comprises a change to any one or more of: status change, location, country of residence, importance of business relationship, volume of business, and credit worthiness.

5. The method of claim 2, further comprising:

the pointers database detecting a change to a record in the organization database; and in response to the change to the record in the organization database, selectively changing a pointer in the pointers database, without changing the records in the customer database.

6. The method of claim 5, wherein the change to the record in the organization database comprises a change to any one or more of: organization hierarchy type, branch office, responsibility, and geopolitical status.

7. A computer program for dynamically linking at least two dissimilar databases, comprising:

a first set of program instructions for linking the two dissimilar databases by means of a pointers database that contains a smaller number of records than a number of records contained in either one of the at least two dissimilar databases;

the pointers database receiving instructions external to the at least two dissimilar databases, to effect relationships changes between the at least two dissimilar databases;

a second set of program instructions for changing pointers between records in the at least two dissimilar databases by changing records in the pointers database, without changing the records in the at least two dissimilar databases; and wherein a ratio of the number of records contained in the pointers database to the number of records contained in either one or the at least two dissimilar databases ranges between approximately 0.005% and 5%.

8. The computer program of claim 7, wherein the at least two dissimilar databases include a customer database and an organization database.

9. The computer program of claim 8, further comprising:

the pointers database detecting a change to a record in the customer database; and in response to the change to the record in the customer database, a third set of instruction codes selectively changes a pointer in the pointers database, without changing the records in the organization database.

10. The computer program of claim 9, wherein the change to the record in the customer database comprises a change to any one or more of: status change, location, country of residence, importance of business relationship, volume of business, and credit worthiness.

11. The computer program of claim 8, further comprising:

the pointers database detecting a change to a record in the organization database; and in response to the change to the record in the organization database, a fourth set of instruction codes selectively changes a pointer in the pointers database, without changing the records in the customer database.

12. The computer program of claim 11, wherein the change to the record in the organization database comprises a change to any one or more of: organization hierarchy type, branch office, responsibility, and geopolitical status.

13. A system for dynamically linking at least two dissimilar databases, comprising:

a pointers database for linking the two dissimilar databases, wherein the pointers database contains a smaller number of records than a number of records contained in either one of the at least two dissimilar databases;

the pointers database receiving instructions external to the at least two dissimilar databases, to effect relationships changes between the at least two dissimilar databases;

in response to the external instructions, the pointers database selectively changes pointers in the pointers database, without changing the records in the at least two dissimilar databases; and wherein a ratio of the number of records contained in the pointers database to the number of records contained in either one or the at least two dissimilar databases ranges between approximately 0.005% and 5%.

14. The system of claim 13, wherein the at least two dissimilar databases include a customer database and an organization database.

15. The system of claim 14, wherein further comprising:

the pointers database detecting a change to a record in the database; and in response to the change to the record in the customer database, the pointers database selectively changing a pointer, without changing the records in the organization database.

16. The system of claim 14, further comprising:

the pointers database detecting a change to a record in the organization database; and in response to the change to the record in the organization database, the pointers database selectively changing a pointer, without changing the records in the customer database.

* * * * *